(12) United States Patent
Manner et al.

(10) Patent No.: US 12,499,711 B2
(45) Date of Patent: Dec. 16, 2025

(54) IDENTIFICATION OF WORKERS USING PERSONAL PROTECTIVE EQUIPMENT AND WORKER MOVEMENT CHARACTERISTIC ANALYSIS

(71) Applicant: 3M INNOVATIVE PROPERTIES COMPANY, St. Paul, MN (US)

(72) Inventors: Marie D. Manner, St. Paul, MN (US); Kiran S. Kanukurthy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 238 days.

(21) Appl. No.: 18/276,633

(22) PCT Filed: Feb. 15, 2022

(86) PCT No.: PCT/IB2022/051344
§ 371 (c)(1),
(2) Date: Aug. 9, 2023

(87) PCT Pub. No.: WO2022/175820
PCT Pub. Date: Aug. 25, 2022

(65) Prior Publication Data
US 2024/0104960 A1 Mar. 28, 2024

Related U.S. Application Data

(60) Provisional application No. 63/151,420, filed on Feb. 19, 2021.

(51) Int. Cl.
*G06V 40/20* (2022.01)
*G06Q 10/0639* (2023.01)
(Continued)

(52) U.S. Cl.
CPC ......... *G06V 40/25* (2022.01); *G06Q 10/0639* (2013.01); *G06V 20/41* (2022.01);
(Continued)

(58) Field of Classification Search
CPC ........ G06V 40/25; G06V 20/41; G06V 20/52; G06V 40/10; G06V 40/28; G06V 20/60; G06Q 10/0639
See application file for complete search history.

(56) References Cited

U.S. PATENT DOCUMENTS 7,761,310 B2 7/2010 Rodgers
7,987,069 B2 7/2011 Rodgers et al.
(Continued)

FOREIGN PATENT DOCUMENTS

AU 2011101355 A4 12/2011
CN 101226597 B 4/2010
(Continued)

OTHER PUBLICATIONS

E. Hossain and G. Chetty, "Multimodal feature learning for gait biometric based human identity recognition," in Neural Information Processing—ICONIP (Lecture Notes in Computer Science), vol. 8227, M. Lee, A. Hirose, Z. G. Hou, and R. M. Kil, Eds. Berlin, Germany: Springer, 2013, pp. 721-728.
(Continued)

*Primary Examiner* — Stephen R Koziol
*Assistant Examiner* — Michael Kim Maiden
(74) *Attorney, Agent, or Firm* — Jonathan V. Sry (57) ABSTRACT

Aspects of the present disclosure relate to a method of identifying a worker, a system that performs the method, or non-transitory computer-readable storage medium that performs the method. The method can include acquiring, by a computer having one or more processors, a video of at least part of a worker from a camera system. The method also
(Continued)

includes identifying, with the computer, a first worker profile based on personal protective equipment of the worker in the video. The method includes identifying, with the computer, a second worker profile based on a worker movement characteristic of the worker in the video. The method also includes determining, with the computer, an identity of the worker within the video based on the correspondence between the first worker profile and the second worker profile. The method also includes performing at least one action in response to determining the identity of the worker.

14 Claims, 6 Drawing Sheets

(51) Int. Cl.
    *G06V 20/40*     (2022.01)
    *G06V 20/52*     (2022.01)
    *G06V 40/10*     (2022.01)

(52) U.S. Cl.
    CPC .............. *G06V 20/52* (2022.01); *G06V 40/10* (2022.01); *G06V 40/28* (2022.01)

(56) References Cited

U.S. PATENT DOCUMENTS

| | | | |
|---|---|---|---|
| 8,675,059 | B2 | 3/2014 | Johnson et al. |
| 9,633,268 | B1 | 4/2017 | Ma et al. |
| 9,934,427 | B2 | 4/2018 | Derenne et al. |
| 10,147,210 | B1 | 12/2018 | Desai et al. |
| 10,387,720 | B2 | 8/2019 | Johnson et al. |
| 10,565,439 | B2 | 2/2020 | Wang et al. |
| 2019/0095601 | A1 | 3/2019 | Chan et al. |
| 2020/0005079 | A1 | 1/2020 | Bapat et al. |
| 2020/0279116 | A1 | 9/2020 | Ylitalo et al. |
| 2020/0410444 | A1* | 12/2020 | Bohannon .......... G06Q 10/0875 |

FOREIGN PATENT DOCUMENTS

| | | |
|---|---|---|
| CN | 101807245 B | 1/2013 |
| CN | 106529499 A | 3/2017 |
| CN | 107590452 A | 1/2018 |
| CN | 105844746 B | 2/2018 |
| CN | 109359580 B | 5/2021 |
| CN | 108563939 B | 5/2022 |
| CN | 108960072 B | 5/2022 |
| WO | 2012077142 A1 | 6/2012 |
| WO | 2019160601 A1 | 8/2019 |

OTHER PUBLICATIONS

W. Kusakunniran, "Recognizing gaits on spatio-temporal feature domain," IEEE Trans. Inf. Forensics Security, vol. 9, No. 9, pp. 1416-1423, Sep. 2014. doi: 10.1109/TIFS.2014.2336379.
Z. Wu, Y. Huang, L. Wang, X. Wang, and T. Tan, "A comprehensive study on cross-view gait based human identification with deep CNNs," IEEE Trans. Pattern Anal. Mach. Intell., vol. 39, No. 2, pp. 209-226, Feb. 2016. doi: 10.1109/TPAMI.2016.2545669.
C. Yan, B. Zhang, and F. Coenen, "Multi-attributes gait identification by convolutional neural networks," 2015 8th International Congress on Image and Signal Processing (CISP 2015).
C. Li, X. Min, S. Sun, W. Lin, and Z. Tang, "DeepGait: A learning deep convolutional representation for view-invariant gait recognition using joint Bayesian," App. Sci., vol. 7, No. 3, p. 15, 2017. doi: 10.3390/app7030210.
T. Wolf, M. Babaee, and G. Rigoll, "Multi-view gait recognition using 3D convolutional neural networks," in Proc. IEEE Int. Conf. Image Process. (ICIP), Sep. 2016, pp. 4165-4169. doi: 10.1109/ICIP.2016.7533144.
F. M. Castro, M. J. M. Jiménez, N. Guil and N. P. D. L. Blanca "Automatic learning of gait signatures for people identification," in Advances in Computational Intelligence, I. Rojas et al., Eds. IWANN 2017, Part II, Lecture Notes in Computer Science, vol. 10306. Cham,Switzerland: Springer, 2017, pp. 257-270. doi: 10.1007/978-3-319-59147-6_23.
Yeoh et al., Clothing-Invariant Gait Recognition Using Convolutional Neural Network, Authorized licensed use limited to: University of Minnesota Duluth. Downloaded on Dec. 18, 2023 at 14:23:28 UTC from IEEE Eplore.
J. Frank, S. Mannor, and D. Precup, "Activity and gait recognition with time-delay embeddings." in AAAI, 2010.
J. Lu, G. Wang, and P. Moulin, "Human identity and gender recognition from gait sequences with arbitrary walking directions," IEEE T-IFS, vol. 9, No. 1, pp. 51-61, 2014.
L. Wang, T. Tan, H. Ning and W. Hu, "Silhouette analysis-based gait recognition for human identification", IEEE Trans. Pattern Anal. Mach. Intell., vol. 25, No. 12, pp. 1505-1518, Dec. 2003.
J. Han and B. Bhanu, "Individual recognition using gait energy image", IEEE Trans. Pattern Anal. Mach. Intell., vol. 28, No. 2, pp. 316-322, Feb. 2006.
C. Chen, J. Liang, H. Zhao, H. Hu and J. Tian, "Frame difference energy image for gait recognition with incomplete silhouettes", Pattern Recognit. Lett., vol. 30, No. 11, pp. 977-984, Aug. 2009.
E. Zhang, Y. Zhao and W. Xiong, "Active energy image plus 2DLPP for gait recognition", Signal Process., vol. 90, No. 7, pp. 2295-2302, Jul. 2010.
A. Roy, S. Sural and J. Mukherjee, "Gait recognition using pose kinematics and pose energy image", Signal Process., vol. 92, No. 3, pp. 780-792, 2012.
J. Han and B. Bhanu, "Individual recognition using gait energy image," IEEE T-PAMI, vol. 28, No. 2, pp. 316-322, 2006.
L. Lee and W. E. L. Grimson, "Gait analysis for recognition and classification," in AFGR, 2002, pp. 155-162.
C. Nakajima, M. Pontil, B. Heisele, and T. Poggio, "Full-body person recognition system," Pattern Recognition, vol. 36, No. 9, pp. 1997-2006, 2003.
E. P. Ijjina and C. K. Mohan, "One-shot periodic activity recognition using convolutional neural networks," in ICMLA, 2014, pp. 388-391.
M. Alotaibi and A. Mahmood, "Improved gait recognition based on specialized deep convolutional neural network," CVIU, vol. 164, pp. 103-110, 2017.
N. Takemura, Y. Makihara, D. Muramatsu, T. Echigo, and Y. Yagi, "On input/output architectures for convolutional neural network-based cross-view gait recognition," IEEE Transactions on Circuits and Systems for Video Technology, 2017.
W. Yuan and L. Zhang, "Gait classification and identity authentication using CNN," in Asian Simulation Conference, 2018, pp. 119-128.
Y. Zhao and S. Zhou, "Wearable device-based gait recognition using angle embedded gait dynamic images and a convolutional neural network," Sensors, vol. 17, No. 3, p. 478, 2017.
Yeoh, "Clothing-Invariant Gait Recognition Using Convolutional Neural Network," Downloaded on Dec. 18, 2023 UTC from IEEE Xplore.
Batchuluun "Body-movement-based human identification using convolutional neural network", Expert Systems with Applications, Jul. 2018, vol. 101, pp. 56-77.
Chen, "A Vision-Based Approach for Ensuring Proper Use of Personal Protective Equipment (PPE) in Decommissioning of Fukushima Daiichi Nuclear Power Station", Applied Sciences, Jul. 2020, vol. 10, No. 15, pp. 5129(1-14).
Harrou, "An Integrated Vision-Based Approach for Efficient Human Fall Detection in a Home Environment," IEEE Access, Aug. 2019, vol. 7, pp. 114966-114974.
International Search Report for PCT International Application No. PCT/IB2022/051344, mailed on May 17, 2022, 5 pages.
Video: "Microsoft CVPR Demo—Time 7:47" Fireside Chat with Nadella-ComputerVisionFoundation Videos, Nov. 2022, URL <https://www.youtube.com/watch?v=6ml8kr1M1Pw>, 2 pages.

(56) References Cited

OTHER PUBLICATIONS

Wu, "A Comprehensive Study on Cross-View Gait Based Human Identification with Deep CNNs", IEEE Transactions on Pattern Analysis and Machine Intelligence, 2017, vol. 39, No. 2, pp. 209-226.

Yan, "Multi-attributes Gait Identification by Convolutional Neural Networks," 2015 8th International Congress on Image and Signal Processing (CISP), 2015, p. 642-647.

Yuan, "A Convolutional Neural Network Based on TensorFlow for Face Recognition", 2017 IEEE 2nd Advanced Information Technology, Electronic and Automation Control Conference (IAEAC), Mar. 2017, IEEE Xplore, pp. 525-529.

\* cited by examiner

IDENTIFICATION OF WORKERS USING PERSONAL PROTECTIVE EQUIPMENT AND WORKER MOVEMENT CHARACTERISTIC ANALYSIS

BACKGROUND

Facial recognition advances can allow identification of workers at worksites by visually identifying the face of a worker. This can have a number of advantages over other identification such as badges, which may be easy for another worker to impersonate. Facial recognition in industrial settings can be difficult since the camera systems occasionally become dirty, or obscured by environmental objects due to the objects being moved around.

Personal protective equipment (PPE) is sometimes necessary to prevent bodily harm while a worker is on the job. However, some PPEs, such as face masks, full face helmets, or tinted safety glasses, obstruct person features that normally would make automated identification (e.g. facial recognition) possible.

BRIEF SUMMARY

There is a need for workers to be recognized even when dressed in feature-obscuring protective equipment, including workers in factories, medical doctors and nurses in hospitals or operating rooms, even manufacturing lines on which disposable respirator use is now required (as is the case in many work places with the spread of COVID-19).

Such recognition requirements may include where a worker has been identified as being exposed to a contagion (e.g. COVID-19) and needs to be notified as soon as possible, but they are one of many obscured workers, and there is no outwardly identifying badge or marker on them; or the worker is no longer authorized to work in an area, due to non-compliant PPE, emergency, or authorization revocation.

In such cases, even if a worker has badged into an area, they may need to be identified when among others, have their day's route retraced, or otherwise identified.

Further, in some cases, a camera system in a worksite may be mounted high on a wall so as to provide more of an overhead or surveillance view, and a camera's point of view can naturally obscure the worker's face.

As other cases, when a worker is walking away from the camera, no change in height of the camera would enable that worker's identification through facial recognition, and PPE or gait or other markers would enable identification.

Aspects of the present disclosure relate to a method of identifying a worker, a system comprising a processor and a memory storing instructions that, when executed by the processor, configure the apparatus to perform the method, and a non-transitory computer-readable storage medium including instructions that, when processed by a computer, configure the computer to perform the method.

The computer-implemented method of identifying a worker can include acquiring, by a computer having one or more processors, a video of at least part of a worker from a camera system. The method also includes identifying, with the computer, a first worker profile based on personal protective equipment of the worker in the video. The method includes identifying, with the computer, a second worker profile based on a worker movement characteristic of the worker in the video. The method also includes determining, with the computer, an identity of the worker within the video based on the correspondence between the first worker profile and the second worker profile. The method also includes performing at least one action in response to determining the identity of the worker.

In some aspects, the identifying the first worker profile can include identifying personal protective equipment worn by the worker in the video, associating identified personal protective equipment with a first transient worker profile, and comparing the identified personal protective equipment in the first transient worker profile with a plurality of personal protective equipment records from a plurality of stored worker profiles.

In some aspects, the method also includes identifying the first worker profile at least partially based on a correspondence of the identified personal protective equipment in the first transient worker profile with a personal protective equipment record associated with a first worker profile from the plurality of stored worker profiles.

In some aspects, the method also includes adding the first transient worker profile to the plurality of stored worker profiles based on a weak correspondence of the identified personal protective equipment with any of the plurality of personal protective equipment records.

In some aspects, the personal protective equipment record is based on historical usage of a worker. For example, the historical usage can include the history of interactions with a particular PPE.

In some aspects, the personal protective equipment record is based on pre-determined personal protective equipment for the worker.

In some aspects, the method also includes determining whether the identified personal protective equipment matches a pre-determined personal protective equipment for the first worker profile, performing at least one action in response to the pre-determined personal protective equipment matching all identified personal protective equipment for the first worker profile.

In some aspects, the actions can include controlling an implement.

In some aspects, the action can include adding a record of the identified personal protective equipment to a data store associated with the first worker profile.

In some aspects, the action comprises tracking the worker in the video using the identity.

In some aspects, identifying the second worker profile can include determining a worker movement characteristic of the worker in the video, associating the worker movement characteristic with a second transient worker profile, determining a worker movement characteristic metric for the worker movement characteristic of the worker, and comparing the worker movement characteristic metric in the second transient worker profile with a plurality of worker movement characteristic metric records from the plurality of stored worker profiles.

In some aspects, the method can include identifying the second worker profile at least partially based on a correspondence of the worker movement characteristic metric from the second transient worker profile with a worker movement characteristic metric record for a second worker profile from the plurality of stored worker profiles.

In some aspects, the method can include adding second transient worker profile to the plurality of stored worker profiles based on a weak correspondence of the worker movement characteristic metric with any of the pluralities of worker movement characteristic metric records.

In some aspects, the method can include determining a worker movement characteristic metric record by establishing a baseline for the stored worker profile.

In some aspects, the baseline can be established over at least 2 days.

In some aspects, identifying the second worker profile comprises determining an activity of the worker using the video.

In some aspects, the worker movement characteristic is an arm movement pattern of the worker, the activity is determined using arm movements of the worker.

In some aspects, the method includes determining the arm movement pattern of the worker in the video, wherein the arm movement pattern is associated with the activity, associating the arm movement pattern with the second transient worker profile, determining an identity of the worker within the video based on the worker movement characteristic, the identified personal protective equipment of the worker, and the arm movement pattern of the worker.

In some aspects, the worker movement characteristic is a gait of the worker.

In some aspects, the first worker profile matches the second worker profile.

In some aspects, the video has a frame rate of at least 25 frames per second.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Aspects of the present disclosure can relate to identifying a worker in a worksite, visually, based on PPE used, and a worker movement characteristic. More specifically, aspects of the present disclosure can relate to analyzing the PPE used and the worker movement characteristic in parallel and rectifying the identifies returned by a personal protective equipment analysis module and a worker movement characteristic analysis module.

Computer software, hardware, and networks may be utilized in a variety of different system environments, including standalone, networked, remote-access (aka, remote desktop), virtualized, and/or cloud-based environments, among others.

Figure 1:
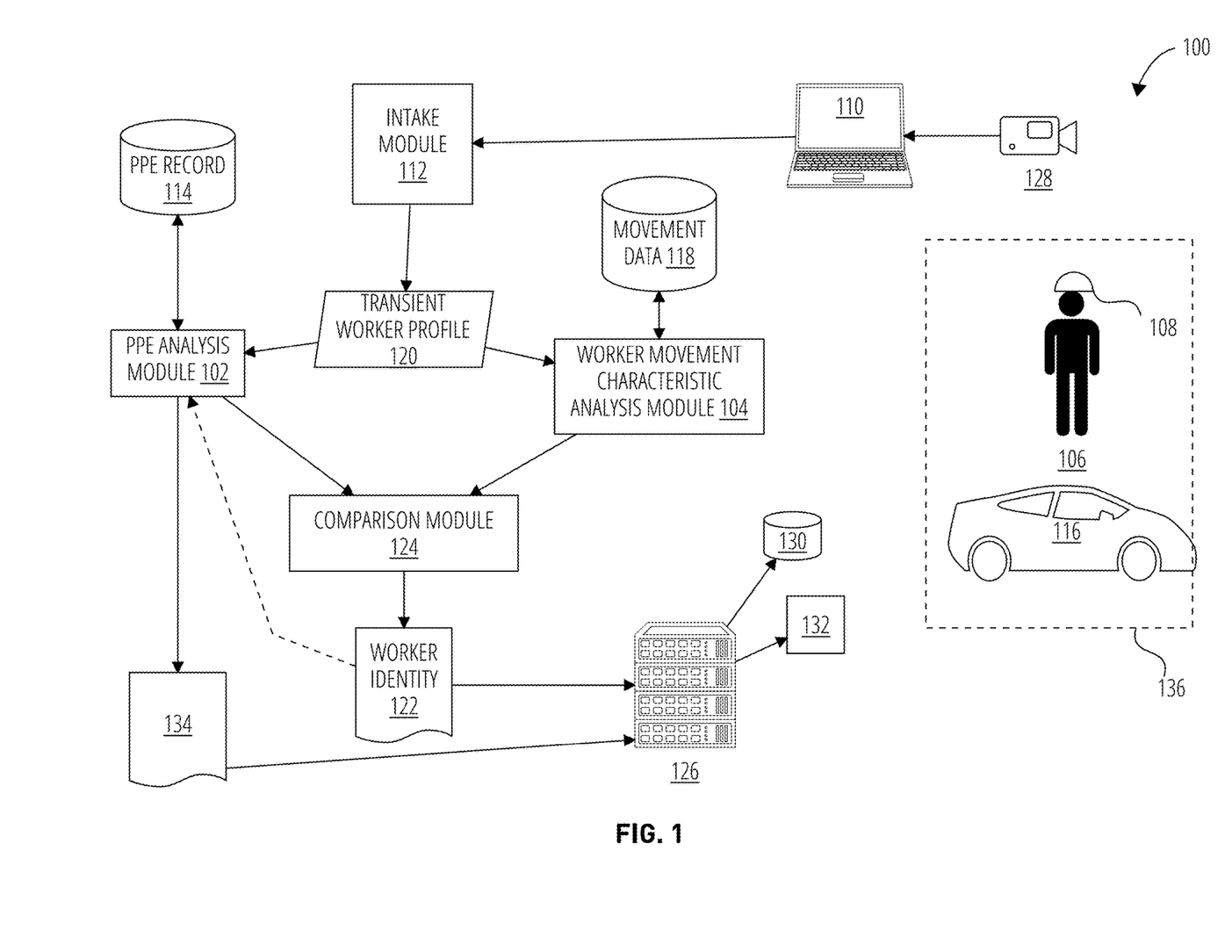
FIG. 1 illustrates a system 100 in accordance with one embodiment.

FIG. 1 illustrates a system 100 for capturing and processing a video feed from a camera system 128. A frame 136 of the video can include a worker 106 in a worksite (such as an industrial or commercial worksite). The frame 136 can also capture a plurality of workers, including the worker 106, within the same frame. Each worker can be separately analyzed.

In at least one embodiment, the camera system 128 can capture video at a frame rate of at least 20, or at least 30 frames per second. In at least one embodiment, the resolution of the camera system 128 is at least 640×480. However, the resolution of the camera system 128 can also depend on a proportion of the frame that the worker 106 occupies. For example, if a worker 106 occupies over half of the frame 136, then lower resolutions can be possible.

In at least one embodiment, the worker 106 can be wearing attire such as personal protective equipment 108.

The worker 106 can be performing at least one activity, either alone, or interacting with an environmental object 116. The environmental object 116 can be any object that is used in the worksite and is not the intended subject of the camera system 128, such as heavy machinery (e.g., an automobile, construction equipment), scaffolding, parts of the building, construction materials, or combinations thereof.

The worker 106 can also have a worker movement characteristic when in motion. The worker movement characteristic can be a unique motion performed by the worker 106 such as gait, interaction with a tool (like a sanding motion), or even common hand gestures.

The camera system 128 can provide video to the computer 110 for analysis in accordance with this disclosure. The computer 110 can receive the video (i.e., the sequence of images that make up a video) from the camera system 128 in real-time. Once received, the computer 110 can analyze the video for a worker identity 122 of the worker 106 (or plurality of workers) and returns the worker identity 122. In at least one embodiment, the computer 110 can determine the worker identity 122 in the absence of facially identifiable features or computer-readable codes (such as barcodes, geometric patterns, etc.).

Computer 110 can run a plurality of modules such as intake module 112, personal protective equipment analysis module 102, worker movement characteristic analysis module 104, and comparison module 124.

The intake module 112 can be a routine of the computer 110 that performs the intake and screening. The intake module 112 can minimize the processing performed by the computer 110 by performing screening of/prioritizing the requests before undertaking the methods described herein (which may be processor intensive). In one embodiment, the intake module 112 allows the computer 110 to perform parallel analysis paths without drawing on excessive computing resources.

In at least one embodiment, the intake module 112 can be configured to interact with the badge recognition system. For example, if the badge recognition system indicates the identity of the worker, then the intake module 112 can avoid the analysis by the personal protective equipment analysis module 102 and worker movement characteristic analysis module 104, thereby saving computational resources. Further, the intake module 112 can enhances the functions of the badge recognition system by supplementing the identity.

In at least one embodiment, the intake module 112 can be configured to perform object detection on the camera system 128 to locate and label workers in the frame of the video. For example, the object detection can occur as an initial operation.

For example, if there are three workers in a worksite, and two are wearing (and therefore obscured by) lens-darkened welding helmets and the third worker is wearing only safety glasses, then the intake module 112 receives instruction to identify a particular worker. First, the intake module 112 can locate the three people by pedestrian identification. Next, the intake module 112 can consider each of the three people; a first worker is identifiable by face, because that worker is not obscured. However, if the first worker is not the particular worker that is being searched for, then the intake module 112 can evaluate the other two workers where two obscured workers are wearing similar PPE (welding helmet, gloves, dark coveralls, dark shirts), but one additionally has a safety vest on.

Figure 2:
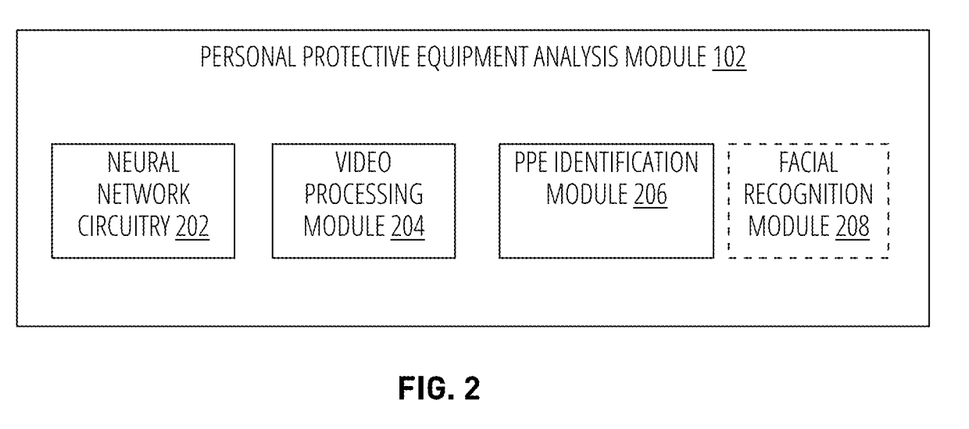
FIG. 2 illustrates exemplary subcomponents of a personal protective equipment analysis module 102 in accordance with one embodiment.

In this example, when a vehicle enters the worksite and stops in the middle of the floor, both obscured workers may begin walking towards the vehicle. The intake module 112 can prepare two transient worker profiles, which may include information like location, time, and other attributes like height and equipment held, and passes each unidentified transient worker profile to the PPE identification module 206 and the worker movement characteristic analysis module 104 for identification.

In at least one embodiment, the intake module 112 may also be able to determine if the worker 106 is already identified through alternative identification means. The alternative identification means can include badge access, keys, computer-readable codes, biometric analysis including facial recognition. For example, if the alternative identification means has already verified the worker 106 identity, then the intake module 112 can return the worker identity 122 based on the alternative identification means. If the alternative identification means is not able to be verified, then the computer 110 can determine the worker identity 122 based on the personal protective equipment analysis module 102 and worker movement characteristic analysis module 104. The intake module 112 can create a transient worker profile 120 for each detected worker for use with personal protective equipment analysis module 102 and worker movement characteristic analysis module 104. In at least one embodiment, multiple transient worker profiles 120 can be created, for example, one for each analysis module.

In at least one embodiment, the opposite can occur where the intake module 112 can be configured to use the alternative identification means to supplement the determination of the worker identity 122. For example, the computer 110 can determine the worker identity 122 based on input from the personal protective equipment analysis module 102 and worker movement characteristic analysis module 104 and use the alternative identification means received to verify the worker identity 122.

The personal protective equipment analysis module 102 and worker movement characteristic analysis module 104 can be used in parallel operations. For example, the PPE analysis and gait analysis can be performed in parallel, or overlapping processes.

In at least one embodiment, the personal protective equipment analysis module 102 can be configured to perform object detection with respect to personal protective equipment 108 on the worker 106. The personal protective equipment analysis module 102 can be configured to record and classify personal protective equipment in use by the worker 106. For example, the personal protective equipment analysis module 102 can result in class labels for each personal protective equipment 108 in the frame 136. The personal protective equipment analysis module 102 can further use the class labels to match with a plurality of personal protective equipment records associated with a plurality of stored worker profiles in a data store 114.

In an example, if the personal protective equipment record indicates that the worker 106 is wearing eye protection, but not a hard hat, then the personal protective equipment analysis module 102 can examine a plurality of stored worker profiles to isolate the workers that either have historically wore only eye protection, have assigned to their worker profile that they should be only wearing eye protection, or have assigned to their worker profile that they should be wearing eye protection and hard hats.

From this, the personal protective equipment analysis module 102 can fetch a list of possible worker profiles. As used herein, the terms "first worker profile" or "second worker profile" can refer to an individual worker profile or a group of worker profiles that are returned by the personal protective equipment analysis module 102 or worker movement characteristic analysis module 104.

In addition, once the worker identity 122 is validated by comparison module 124, then the personal protective equipment analysis module 102 can also fetch a personal protective equipment record 134 for the worker 106 to determine whether the worker 106 was wearing the necessary personal protective equipment 108. For example, if the worker 106 was wearing eye protection and not a hard hat but was required to wear both eye protection and a hard hat, then the personal protective equipment analysis module 102 can communicate the lack of a hard hat to the computer 126 for further actions.

The worker movement characteristic analysis module 104 be communicatively coupled to the data store 118 and the camera system 128. The worker movement characteristic analysis module 104 can be configured to record and classify worker movement characteristics of the worker 106 moving throughout frame 136 based on the video received from the camera system 128. For example, worker movement characteristics can be a gait or arm movement patterns of the worker 106 interacting with an implement.

The worker movement characteristic analysis module 104 can perform classification of various worker movements. The classification can allow the worker movement characteristic analysis module 104 to create a worker movement characteristic metric. For example, if the worker movement characteristic is a gait, then the worker movement characteristic can be a hip alignment angle during a step, timing of foot strikes, elbow angle, stride length, pace, asymmetric walking or foot balance, supination (weight on the outside of the foot), pronation (weight on the inside of the foot), or combinations thereof.

Once patterned, the worker movement characteristic analysis module 104 can also determine how the worker movement characteristic metric compares to a plurality of worker movement characteristic metric records from a plurality of stored worker profiles. From this, the worker movement characteristic analysis module 104 can fetch a list of possible worker profiles based on the worker movement characteristic metric record. In at least one embodiment, the possible worker profiles can be arranged by the probability as determined by worker movement characteristic analysis module 104.

In at least one embodiment, the worker movement characteristic analysis module 104 can compare the recorded gait of unidentified workers with the records in the data store 118 of identified gaits. If the worker gait matches any recorded worker profile in the data store, the system logs any gait adjustments. The worker movement characteristic analysis module 104 can record any adjustments or changes to the worker movement characteristic metrics such as shorter stride or slower walks (as late in the day when a person is tired), new postures, such as heavy lifting, dragging, or pushing, dangerous motions, such as heavy lifting that will result in neck, back, or knee injuries, or motions that indicate classification of drowsiness, fatigue, or poor attention.

The comparison module 124 can be communicatively coupled to both the personal protective equipment analysis module 102 and the worker movement characteristic analysis module 104. The comparison module 124 can be configured to receive the respective first worker profile and the second worker profile to determine if there is a correspondence between the two.

In at least one embodiment, the comparison module 124 can use a variety of techniques. For example, the comparison module 124 can use the Spearman footrule distance to determine the ranking of the combined list.

The correspondence can be determined based on different weights placed on the first worker profiles and the second worker profiles. For example, if the second worker profiles are weighted higher, then the comparison module 124 can compare the top result from each the second worker profile and the first worker profile.

In another example, if the second-ranked worker profile from each of the first worker profiles and the second worker profiles match, but not the first-ranked worker profile, then the second-ranked worker profile can be selected by comparison module 124 as the probability of a worker profile.

In at least one embodiment, if a worker movement characteristic and personal protective equipment does not match any stored worker profile in either data store, the computer 110 can log the gait analysis and used PPE of the transient worker profile 120 in the system.

The computer 110 can be optionally communicatively coupled to computer 126. For example, computer 126 may be a part of computer 110 or computer 110 can be configured to perform the functions of computer 126. The computer 126 can be configured to perform an action in response to the worker identity 122 and/or the personal protective equipment record 134. The computer 126 can be communicatively coupled with implement 132 and data store 130.

The implement 132 can be any device that the worker interacts with. For example, the implement 132 can be a tool, a portion of personal protective equipment, or environmental object 116. In at least one embodiment, the implement 132 can have electronic control circuitry that controls one or more aspects of the implement 132 such as a fan, motor, release lever, etc.

The data store 130 can store records such as access records, personnel records, or performance records which can be accessed by the computer 126 or another computer.

The computer 126 can perform various actions in response to the determination of the worker identity 122. Examples of the computer 126 actions that can be performed are provided herein.

For example, if the personal protective equipment record 134 indicates that the worker 106 is wearing the appropriate personal protective equipment 108, then the computer 126 can perform an action such as unlocking an access door or sending instructions to activate a tool, or activate functions of personal protective equipment 108 such as auto-darkening of a welding helmet.

If the worker identity 122 does not allow access to an implement 132, then the computer 126 can send instructions to the implement 132 not to activate.

If the worker identity 122 indicates a worker 106 with a medical condition, then the computer 126 can send instructions to implement 132. For example, if the worker identity 122 indicates a worker 106 with prior heat injuries such as heat stress, then the computer 126 can send instructions to implement 132 (e.g., fan or cooling unit) to activate.

The computer 126 can log the presence of the worker 106 based on the worker identity 122 such as implement 132 use, interaction with the environmental object 116, or performance metrics to store within the data store 130. In at least one embodiment, the computer 126 can log the worker 106 in and create a time stamp.

If the worker identity 122 allows access to exclusive modes of the implement 132 such as administrator privileges, then the computer 126 can send instructions to the implement 132 to unlock the exclusive mode.

The worker identity 122 can be stored in the data store 130 in response to the worker 106 being present. If a worker 106 has been identified as being exposed to a contagion or environmental hazard (e.g., COVID-19) and needs to be notified as soon as possible, then the computer 126 can notify the worker 106.

The worker identity 122 can used by the computer 126 to perform access control. In such cases, even if a worker has badged into an area, they may need to be identified when among others, have their day's route retraced, or otherwise identified. Using gait recognition, in combination with protective gear, enables rapid person identification in such cases, even if a worker has not 'badged' into an area.

FIG. 2 illustrates the component modules of the personal protective equipment analysis module 102. For example, the personal protective equipment analysis module 102 can include neural network circuitry 202, video processing module 204, PPE identification module 206, and facial recognition module 208.

The neural network circuitry 202 can include a parallel processor with sub parallel processors that can carry out, simultaneously, a large amount of computations for the use of a deep learning model. The neural network circuitry 202 can use any machine learning model to perform object detection. Some examples are based on neural network circuitry 202.

Examples of deep learning models include neural networks such as Faster RCNN structure with Inception V2 convolutional network to generate the reduced image information for both Regional Proposal Network and the Classifier. Due to the lack of feature complexity, single shot detection techniques can be used. These techniques can make one pass over the image (e.g., YOLO) to reduce processing time.

For identifying unexpected situations (for example, backwards hardhats, respirators above mouth level of orientation that are not correct, safety glasses on the back of the head), the computer can use object detection and rules for what is expected on various body parts. For example, the computer can use the neural network circuitry 202 to look for PPE, generate a (topological) skeleton and map the PPE onto the skeleton. From this, the computer can classify (both correct and incorrect orientations) using additional neural network circuitry 202. In another example, the computer can use simpler logic around body part locations, proximity of PPE to body part, and expected location of the PPE to expected body part. For things that are unexpected like backwards hardhats (still on your head but not on correctly), the computer can use classification networks or key off PPE markers like the location of the UV indicator on a hardhat.

The neural network circuitry 202 can also be communicatively coupled to a data store. In at least one embodiment, the data store can store training data used to train the deep learning model. In at least one embodiment, the training data can include at least 500 different images or video segments.

The video processing module 204 can be configured to process the incoming video. For example, the video processing module 204 can pre-process the video by performing the cropping, contrast, and frame sorting. Examples of pre-processing can be performed by OpenCV libraries. In at least one embodiment, the video processing module 204 can upscale the underlying images of the video to 640×480 X3 RGB form.

The PPE identification module 206 can be configured to detect the personal protective equipment assigned to the worker. The PPE identification module 206 can be communicatively coupled to the neural network circuitry 202 and video processing module 204. In at least one embodiment, the PPE identification module 206 can utilize the techniques taught by Shi Chen and Kazuyuki Demachi, "A Vision-Based Approach for Ensuring Proper Use of Personal Protective Equipment (PPE) in Decommissioning of Fukushima Daiichi Nuclear Power Station." *Applied Sciences, vol.* 10, 2020, p. 5129. In Chen et. al., the YOLOv3 model was used to identify personal protective equipment and the OpenPose was used to model a skeleton. YOLOv3 uses a deep architecture which has 106 fully convolutional layers which detects objects at three different scales. The personal protective equipment was mapped in relation to points on the skeleton in order to determine whether the personal protective equipment was worn correctly by the worker.

The facial recognition module 208 can be configured to identify faces of the worker and determine the identity of the worker based in part on the facial features of the worker. Facial identification is accomplished via multiple techniques such as that described by L. Yuan, Z. Qu, Y. Zhao, H. Zhang and Q. Nian, "A convolutional neural network based on TensorFlow for face recognition," 2017 *IEEE 2nd Advanced Information Technology, Electronic and Automation Control Conference (IAEAC)*, Chongqing, 2017, pp. 525-529, doi: 10.1109/IAEAC.2017.8054070. In at least one embodiment, the facial recognition module 208 can be used to classify features from the worker's face.

In at least one embodiment, the facial features can be used to determine whether the worker is properly wearing the personal protective equipment. For example, the facial features (e.g., eyes, nose, and ears) can be classified in order to compare against the position of the identified personal protective equipment. For example, properly worn safety goggles should cover the position of the eyes and touch the nose and ears. Improperly worn safety goggles may touch the ears. Thus, the facial recognition module 208 can interface with the PPE identification module 206.

At least some of the component modules of the personal protective equipment analysis module 102 can be used by the computer to both identify the personal protective equipment and determine if it is worn correctly.

Figure 3:
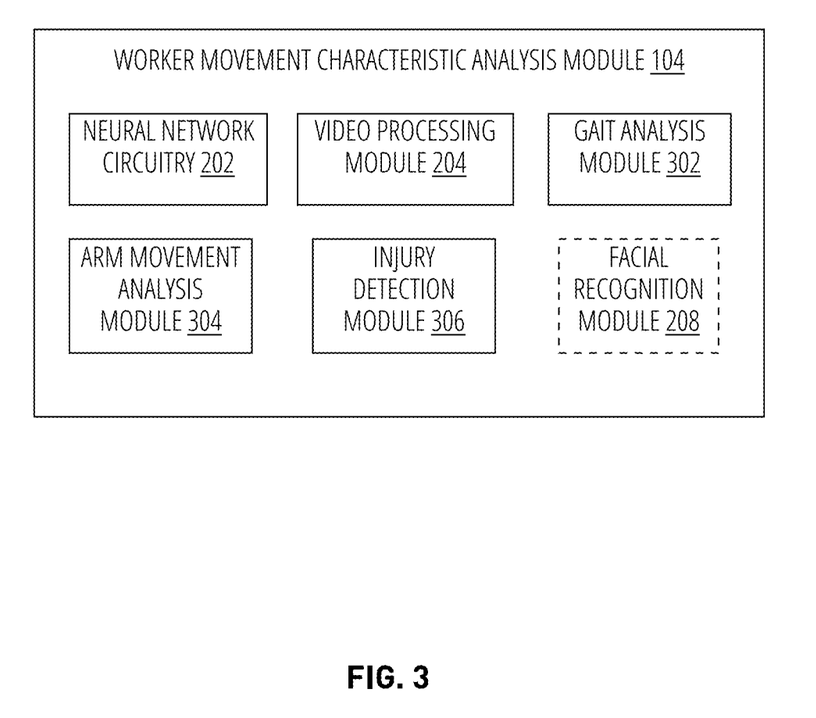
FIG. 3 illustrates exemplary subcomponents of worker movement characteristic analysis module 104 in accordance with one embodiment.

FIG. 3 illustrates components of the worker movement characteristic analysis module 104 used to allow the computer to identify workers based on the worker movement characteristics. The worker movement characteristic analysis module 104 can include the neural network circuitry 202, the video processing module 204, and the facial recognition module 208 (described above), the gait analysis module 302, arm movement analysis module 304, and injury detection module 306.

The gait analysis module 302 can be communicatively coupled to the neural network circuitry 202 and can be configured to analyze the gait of the worker. The gait analysis can be accomplished using multiple techniques such as that performed by Z. Wu, Y. Huang, L. Wang, X. Wang, and T. Tan, "A comprehensive study on cross-view gait based human identification with deep CNNs," IEEE Trans. Pattern Anal. Mach. Intell., vol. 39, no. 2, pp. 209-226, February 2016. doi: 10.1109/TPAMI.2016.2545669 or by C. Yan, B. Zhang, and F. Coenen, "Multi-attributes gait identification by convolutional neural networks," 8th International Congress on Image and Signal Processing, 2015.

The arm movement analysis module 304 can be communicatively coupled to the neural network circuitry 202 and can be configured to analyze the arm movement patterns of the worker 106 when undertaking an activity. The activity can include those found in a worksite in an industrial setting, for example, inspecting, operating machinery, performing tool interaction such as sanding, polishing, or painting. The arm movement analysis can be accomplished using techniques such as that described by Ganbayar Batchuluun, Rizwan Ali Naqvi, Wan Kim, Kang Ryoung Park, "Body-movement-based human identification using convolutional neural network", *Expert Systems with Applications*, Volume 101, pages 56-77, 2018.

The injury detection module 306 can be communicatively coupled to the neural network circuitry 202 and can be configured to analyze whether the worker 106 has an injury based on the video. Various methods of detecting injuries by neural networks are known such as that described by F. Harrou, N. Zerrouki, Y. Sun and A. Houacine, "An Integrated Vision-Based Approach for Efficient Human Fall Detection in a Home Environment," in *IEEE Access*, vol. 7, pp. 114966-114974, 2019.

Figure 4:
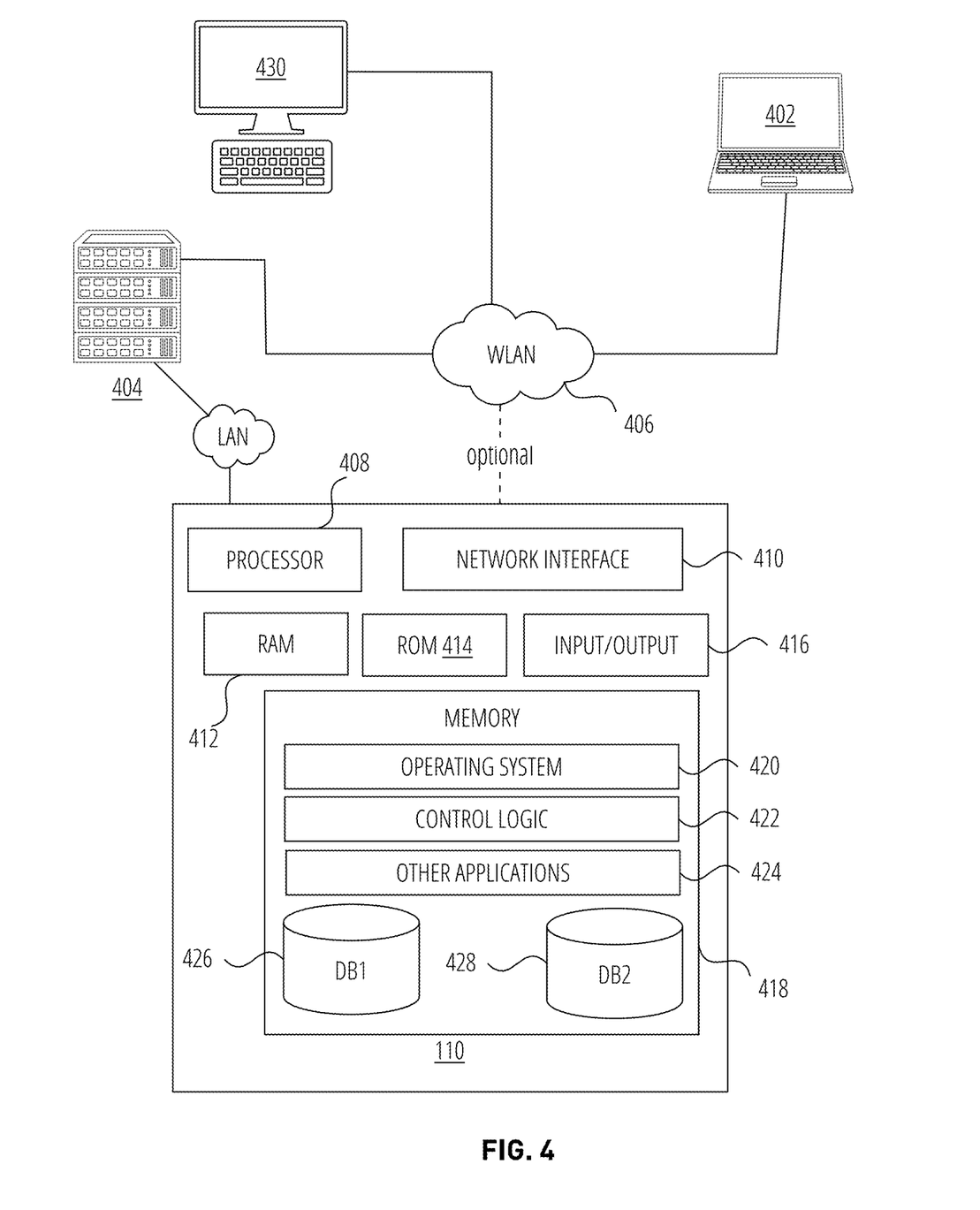
FIG. 4 depicts an illustrative computer system architecture that may be used in accordance with one or more illustrative aspects described herein.

FIG. 4 illustrates one example of a system architecture and data processing device that may be used to implement one or more illustrative aspects described herein in a stand-alone and/or networked environment. Various network nodes such as computer 110, web server 404, computer 430, and laptop 402 may be interconnected via a wide area network 406 (WAN), such as the internet. Other networks may also or alternatively be used, including private intranets, corporate networks, LANs, metropolitan area networks (MANs) wireless networks, personal networks (PANs), and the like. Network 406 is for illustration purposes and may be replaced with fewer or additional computer networks. A local area network (LAN) may have one or more of any known LAN topology and may use one or more of a variety of different protocols, such as ethernet. Devices computer 110, web server 404, computer 430, laptop 402 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include computer 110, web server 404, and computer 430, laptop 402. Computer 110 provides overall access, control and administration of databases and control software for performing one or more illustrative aspects described herein. Computer 110 may be connected to web server 404 through which users interact with and obtain data as requested. Alternatively, computer 110 may act as a web server itself and be directly connected to the internet. Computer 110 may be connected to web server 404 through the network 406 (e.g., the internet), via direct or indirect connection, or via some other network. Users may interact with the computer 110 using remote computer 430, laptop 402, e.g., using a web browser to connect to the computer 110 via one or more externally exposed web sites hosted by web server 404. Client computer 430, laptop 402 may be used in concert with computer 110 to access data stored therein, or may be used for other purposes. For example, from client computer 110, a user may access web server 404 using an internet browser, as is known in the art, or by executing a software application that communicates with web server 404 and/or computer 110 over a computer network (such as the internet).

Servers and applications may be combined on the same physical machines, and retain separate virtual or logical addresses, or may reside on separate physical machines. FIG. 4 illustrates just one example of a network architecture that may be used, and those of skill in the art will appreciate that the specific network architecture and data processing devices used may vary, and are secondary to the functionality that they provide, as further described herein. For example, services provided by web server 404 and computer 110 may be combined on a single server.

Each component computer 430, web server 404, computer 110, laptop 402 may be any type of known computer, server, or data processing device. Computer 110, e.g., may include a processor 408 controlling overall operation of the computer 110. Computer 110 may further include RAM 412, ROM 414, network interface 410, input/output interfaces 416 (e.g., keyboard, mouse, display, printer, camera system etc.), and memory 418. Input/output interfaces 416 may include a variety of interface units and drives for reading, writing, displaying, capturing video and/or printing data or files.

Memory 418 may further store operating system software 420 for controlling overall operation of the computer 110, control logic 422 for instructing web server 404 to perform aspects described herein, and other application software 424 providing secondary, support, and/or other functionality which may or may not be used in conjunction with aspects described herein. The control logic may also be referred to herein as the data server software control logic 422. Functionality of the data server software may refer to operations or decisions made automatically based on rules coded into the control logic, made manually by a user providing input into the system, and/or a combination of automatic processing based on user input (e.g., queries, data updates, etc.).

Memory 418 may also store data used in performance of one or more aspects described herein, including a first database 428 and a second database 426. In some embodiments, the first database may include the second database (e.g., as a separate table, report, etc.). That is, the information can be stored in a single database, or separated into different logical, virtual, or physical databases, depending on system design. Web server 404, computer 430, laptop 402 may have similar or different architecture as described with respect to computer 110. Those of skill in the art will appreciate that the functionality of computer 110 (or web server 404, computer 430, laptop 402) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 5:
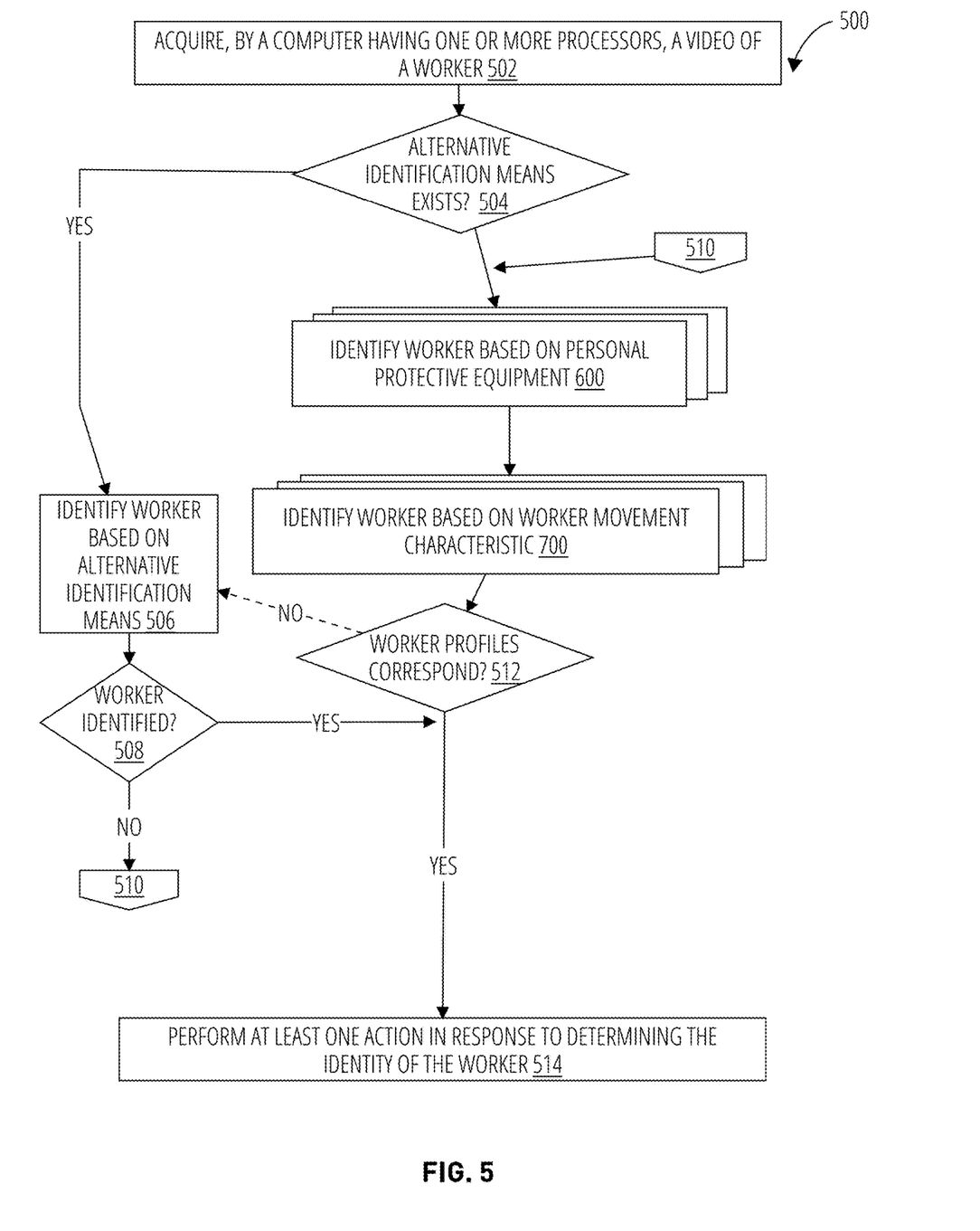
FIG. 5 illustrates a routine 500 in accordance with one embodiment.

FIG. 5 illustrates a routine 500 of the computer identifying the worker based on the personal protective equipment and the worker movement characteristic in the video.

In block 502, routine 500 acquires, by a computer having one or more processors, a video of a worker. The worker can be wholly or partially in the frame of the video and include a plurality of workers also within the frame. The worksite can be shown in the video along with any environmental objects.

Figure 6:
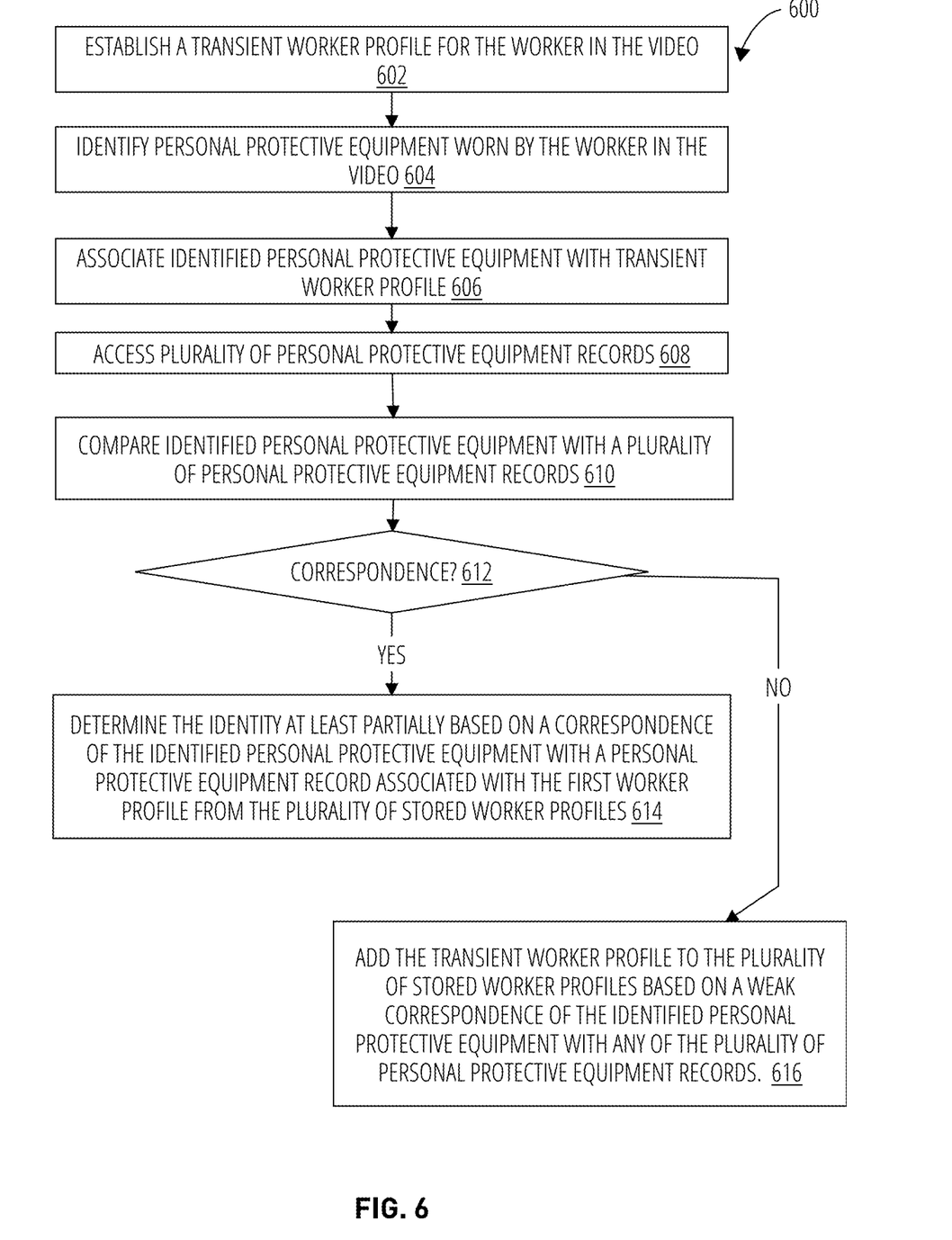
FIG. 6 illustrates a subroutine 600 in accordance with one embodiment.

In decision block 504, the routine 500 determines, using a computer having one or more processors, whether an alternative identification means exists. The alternative identification means is described herein and can refer to facial recognition or badge access as a means of identification. If the alternative identification means exists, then the routine 500 can proceed to block 506. In block 506, the routine 500 can identify, by a computer having one or more processors, the worker based on the alternative identification means alone. If the worker can be identified in decision block 508, then the alternative identification means can be used as a primary identification means without involvement of PPE analysis or movement analysis. However, the situation may occur where the worker cannot be visually identified because the personal protective equipment obscures the face of the worker and the worker cannot be identified in block 510. The routine 500 can continue to subroutine 600.

Figure 7:
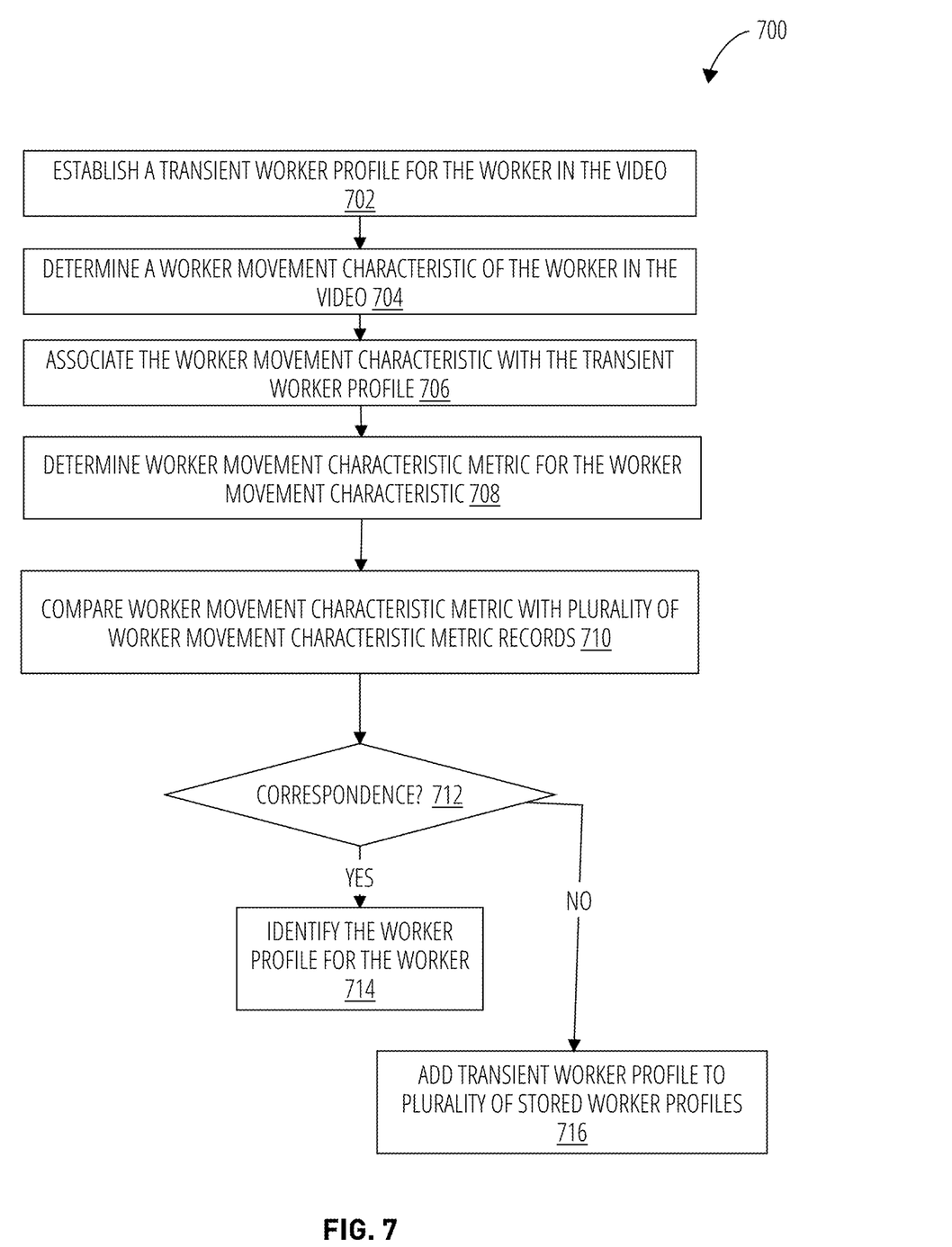
FIG. 7 illustrates a subroutine 700 in accordance with one embodiment.

In at least one embodiment, the identification of the alternative identification means (e.g., facial recognition or badge access) is not used as a primary identification method. For example, the alternative identification means is used as a backup identification means to clarify a discrepancy between the PPE identification module and worker movement characteristic analysis module, e.g., decision block 504, subroutine 600, subroutine 700, and decision block 512.

Subroutine 600 and subroutine 700 are order indeterminate and can happen in any order, including in parallel. In subroutine 600, the computer can identify the worker based on personal protective equipment on the worker. In subroutine 700, the computer can identify the worker based on the worker movement characteristic compared to other workers. Subroutine 600 and subroutine 700 are described further herein.

Once a list of one or more worker profiles are each returned from both subroutine 600 and subroutine 700, the computer can reconcile the lists in decision block 512. The computer can determine whether the worker profiles from subroutine 600 correspond to the worker profiles from subroutine 700 using a variety of techniques.

One method of reconciliation is for each subroutine 600 and subroutine 700 to generate/output a list of probabilities that the transient worker profile is each possible worker known to the module, combine the lists, and using maximum likelihood estimation to generate a final proposal. The computer can use a discriminant function that combines the two lists, for example by summing the probability scores for each possible worker to generate a single list of likelihoods, then take the maximum probability as the predicted worker.

For example, the computer can generate a prediction value corresponding to a likelihood that each known worker profile is the same as the worker in the input video feed. The prediction value can be for all profiles with a likelihood greater than some threshold of confidence (e.g., a 50% confidence threshold) for each of the worker personal protective equipment analysis module's output of possible profiles and the worker movement characteristic module's output of possible profiles.

In the event that both the PPE analysis module and the worker movement characteristic analysis module provide the same known worker profile, then the computer can determine that the worker profile is the likeliest identity. The next highest confidence can be below a delta threshold (e.g., the next highest prediction is at least 10% less confident than the top choice) and then the PPE and worker movement characteristic analysis modules can agree. The input video of the worker can be labeled by the computer as the agreed-upon worker from those modules.

In cases where the worker PPE analysis module and the movement characteristic analysis modules do not agree (e.g., where there are several workers that wear the same style and configuration of PPE, or where two workers that are roughly the same height are pushing or lifting the same large item at the same time and are forced into having matching gaits for that event duration), one or both modules may output their top several choices as being within a very close confidence range, or output that there is no very confident worker profile prediction, and allow the other module to be the tie-breaker.

In cases where one module (e.g., PPE analysis or movement analysis module) is extremely confident in its prediction choice and the other module is extremely unconfident of its prediction choice, the confident module's output may be taken for the worker profile prediction.

In cases where neither module is confident enough of the predicted worker profile, the modules can request more input data, or after some period of time simply label the transient worker profile as an unknown worker.

Further, the computer can also perform an action such as prompting a human to confidently label the transient worker profile as a known worker, in which the modules can update their corresponding known worker profile. Such feedback can be provided back into the neural network circuitry as a training operation to improve the fitting of the underlying machine learning model.

In another example in which lists need to be reconciled, a worker may have changed PPE that contains fiducial markers that were unique to that worker, such as PPE (e.g., hard hats) personalized with stickers or pen markings. A worker having with such a personalized PPE when the computer was building worker profiles, but who changed into an unmarked hardhat will now make the PPE analysis module less confident that the computer has identified the correct worker. To solve for this, the PPE analysis module can update that worker profile. Alternatively, the worker may continue to personalize their PPE over time, as by occasionally adding new stickers to their hardhat, requiring the PPE module to occasionally update that worker's profile.

In block 514, the computer can be configured to perform at least one action in response to determining the identity of the worker. Examples of various actions can be divided into data store tasks such as tracking, logging, and record keeping, and controlling tasks such as access control to implements or doors described further herein. The actions can be performed by the computer, by devices that are in communication with the computer, or combinations thereof.

FIG. 6 illustrates subroutine 600 that is performed by the computer having one or more processors. Aspects of the subroutine 600 can be executed using the personal protective equipment analysis module 102 in FIG. 1 and FIG. 2.

In block 602, the computer can establish a transient worker profile for the worker in the video. In at least one embodiment, the transient worker profile can be first established prior to analysis by the personal protective equipment analysis module 102 (for example, the intake module 112). The transient worker profile can be utilized by both the subroutine 600 and subroutine 700.

In block 604, the computer can identify personal protective equipment worn by the worker in the video. This technique can be similar to that described herein.

In block 606, the computer can associate identified personal protective equipment with transient worker profile. For example, the identified personal protective equipment in block 604 can be added to the records of the transient worker profile which can be used to search a plurality of personal protective equipment records from a data store.

In block 608, the computer can access plurality of personal protective equipment records in a data store. For example, if the personal protective equipment record found on the worker is one type of PPE (e.g., safety glasses), then the computer can query the data store for all stored worker profiles that either have historically used only that type of PPE (e.g., safety glasses), are assigned only that type of PPE (e.g., safety glasses), or are assigned at least that type of PPE (e.g., safety glasses plus steel toe boots).

In block 610, the computer can compare identified personal protective equipment with a plurality of personal protective equipment records. In decision block 612, the computer can determine if there was a correspondence between the records in the transient worker profile and any of the plurality of stored worker profiles. For example, the correspondence can exist between the transient worker profile and a stored worker profile if the actual personal protective equipment matches the personal protective equipment record of a stored worker profile. In at least one embodiment, correspondence can also exist even if the stored worker profile has more unmatched PPE than is on the personal protective equipment record.

In block 614, in response to a correspondence, the computer can determine the identity at least partially based on a correspondence of the identified personal protective equipment with a personal protective equipment record associated with the first worker profile from the plurality of stored worker profiles. In at least one embodiment, the computer can return a plurality of stored worker profiles that all correspond in varying degrees to the transient worker profile. For example, the first worker profile can be a ranked list of stored worker profiles which can be used by the comparison module 124.

In block 616, in response to no/weak correspondence, the computer can add the transient worker profile to the plurality of stored worker profiles based on a weak correspondence of the identified personal protective equipment with any of the plurality of personal protective equipment records. For example, if none of the plurality of stored worker profiles correspond to the transient worker profile, then the transient worker profile and the identified personal protective equipment can be added to the data store for later retrieval.

The computer can also scope out an expanded query in response to a lack of returned worker profiles. For example, if no worker profiles were assigned only eye protection, then the computer can expand the scope to worker profiles that include eye protection (under the assumption that the worker was also supposed to be wearing other PPE).

FIG. 7 illustrates a subroutine 700 that is performed by the computer having one or more processors. Aspects of the subroutine 700 can be executed using the worker movement characteristic analysis module 104 in FIG. 1 and FIG. 3.

In block 702, the computer can establish a transient worker profile for the worker in the video. Like in block 602, block 702 can be performed by the intake module 112 or by the worker movement characteristic analysis module 104. In at least one embodiment, the transient worker profile from block 702 can be different than the transient worker profile created in block 602.

In block 704, the computer can determine a worker movement characteristic of the worker in the video. For example, the worker movement characteristic can be classified according to neural network techniques as described herein. In block 706, associate the worker movement characteristic with the transient worker profile.

In block 708, the computer can determine worker movement characteristic metric for the worker movement characteristic. In at least one embodiment, the worker movement characteristic metric does not have to be a numerical value but instead can be a sequence of images representative of the worker movement. In at least one embodiment, the worker movement characteristic metric can be established by the computer first establishing a baseline value for the worker movement. The baseline can be based on movement established during a time period. For example, the baseline can be established by the computer taking measurements of the worker while the worker moves to establish criteria for how the worker moves. This baseline can occur over the course of a two or more days. Thus, when there are changes, then the computer can send a signal that the baseline has changed.

In block 710, the computer can compare worker movement characteristic metric with plurality of worker movement characteristic metric records. For example, if the worker movement characteristic metric is numerical, then the worker movement characteristic metric can be compared to worker movement characteristic metric records to identify the stored worker profile in the data store. If the worker movement characteristic metric is image-based, then the reference images can be compared to other reference images in the data store to identify the stored worker profiles.

For example, in decision block 712, the computer can determine whether the worker movement characteristic metric corresponds to any worker movement characteristic metric records and/or whether the transient worker profile corresponds to any of the plurality of stored worker profiles in the data store based on the worker movement characteristic.

If the computer determines a correspondence, then in block 714, the computer can identify a second worker profile for the worker. The second worker profile can be different from the first worker profile from subroutine 600. In at least one embodiment, the second worker profile can represent a plurality of stored worker profiles. For example, the second worker profile can be a ranked list of plurality of stored worker profiles.

If the computer determines that there is no correspondence in decision block 712, then in block 716, the computer can add transient worker profile to plurality of stored worker profiles in the data store.

"Correspondence" refers to being equivalent or similar in character, quantity, quality, origin, structure, or function while correlate is to compare things and bring them into a relation having corresponding characteristics.

"Data store" refers to a repository for persistently storing and managing collections of data. Data stores can include not only repositories like databases, but also simpler store types such as simple files, emails. The data can be structured, or unstructured.

"Deep learning model" refers to part of a broader family of machine learning methods based on artificial neural networks with representation learning. Learning can be supervised, semi-supervised or unsupervised. Most modern deep learning models are based on artificial neural networks, specifically, Convolutional Neural Networks (CNN)s, although they can also include propositional formulas or latent variables organized layer-wise in deep generative models such as the nodes in deep belief networks and deep Boltzmann machines. Deep learning model differs from an artificial neural network in that an artificial neural network includes one hidden layer whereas a deep learning model includes two or more hidden layers.

"Environmental object" refers to an object within the frame of the video. The worker can interact with the environmental object. The environmental object can also be filtered by the computer during image processing. Examples of environmental objects include but are not limited to automobiles in auto body shop, construction equipment, tools that are not used by the worker, or other implements.

"Object detection" refers to a combination of object localization and image classification.

"Personal protective equipment" refers to equipment designed to be worn on a worker. Personal protective equipment can be designed to protect the worker from hazards. Examples of personal protective equipment include but are not limited to safety glasses, coveralls, respirators, hoods, welding helmets, gloves, protective boots, high-visibility apparel, or body armor.

"Video" refers to a series of moving visual images. The video includes a plurality of images arranged in a time sequence.

"Worker" refers to a person who does a specified type of work or who works in a specified way. Worker can include a worker for a particular task, for example, a shopper at a store bagging groceries can be a worker for the purpose of the task of bagging groceries. Worker can also include a person that performs a task in exchange for compensation by an employer. The term "worker" can refer to a human, particularly a manual laborer. In at least one embodiment, the worker can also refer to a robot or animal.

"Worker movement characteristic" refers to a unique motion performed by the worker. Worker movement characteristic can include gait or arm movement patterns performed by the worker.

"Worker movement characteristic metric" refers to a metric to quantify the worker movement characteristic. For example, the worker movement characteristic metric for a gait can refer to the period of time between footsteps, angle of knees upon impact, or alignment of gait. The worker movement characteristic metric for an arm movement pattern can refer to the pattern itself or the timing of motions when mapped onto a three-dimensional space. In one embodiment, the worker movement characteristic metric can be an image or pair of images from the video that is able to be compared to other worker movement characteristic metrics (e.g., other reference images.)

"Worksite" refers to an area where manual work is performed by workers. The worksite can encompass industrial or light commercial areas.

What is claimed is:

1. A computer-implemented method of identifying a worker, comprising:
    acquiring, by a computer having one or more processors, a video of at least part of a worker from a camera system;
    identifying, with the computer, a first worker profile based on personal protective equipment of the worker in the video, wherein the identifying the first worker profile comprises:
        identifying personal protective equipment worn by the worker in the video;
        associating identified personal protective equipment with a first transient worker profile;
        comparing the identified personal protective equipment in the first transient worker profile with a plurality of personal protective equipment records from a plurality of stored worker profiles; and
        identifying the first worker profile at least partially based on a correspondence of the identified personal protective equipment in the first transient worker profile with a personal protective equipment record associated with the first worker profile from the plurality of stored worker profiles;
    adding the first transient worker profile to the plurality of stored worker profiles based on a weak correspondence of the identified personal protective equipment with any of the plurality of personal protective equipment records;
    identifying, with the computer, a second worker profile based on a worker movement characteristic of the worker in the video;
    determining, with the computer, an identity of the worker within the video based on a correspondence between the first worker profile and the second worker profile; and
    performing at least one action in response to determining the identity of the worker.

2. The method of claim 1, further comprising:
    determining whether the identified personal protective equipment matches a pre-determined personal protective equipment for the first worker profile;
    performing at least one action in response to the pre-determined personal protective equipment matching all identified personal protective equipment for the first worker profile.

3. The method of claim 1, wherein the identifying the second worker profile comprises:
    determining a worker movement characteristic of the worker in the video;
    associating the worker movement characteristic with a second transient worker profile;
    determining a worker movement characteristic metric for the worker movement characteristic of the worker;
    comparing the worker movement characteristic metric in the second transient worker profile with a plurality of worker movement characteristic metric records from the plurality of stored worker profiles.

4. The method of claim 3, further comprising:
    identifying the second worker profile at least partially based on a correspondence of the worker movement characteristic metric from the second transient worker profile with a worker movement characteristic metric record for a second worker profile from the plurality of stored worker profiles.

5. The method of claim 4, further comprising:
    adding second transient worker profile to the plurality of stored worker profiles based on a weak correspondence of the worker movement characteristic metric with any of the pluralities of worker movement characteristic metric records.

6. The method of claim 1, wherein the worker movement characteristic is an arm movement pattern of the worker, the activity is determined use arm movements of the worker, further comprising:
    determining the arm movement pattern of the worker in the video, wherein the arm movement pattern is associated with the activity;
    associating the arm movement pattern with the second transient worker profile;
    determining an identity of the worker within the video based on the worker movement characteristic, the identified personal protective equipment of the worker, and the arm movement pattern of the worker.

7. The method of claim 1, wherein the worker movement characteristic is a gait of the worker.

8. A non-transitory computer-readable storage medium including instructions that, when processed by a computer, configure the computer to perform the method of claim 1.

9. A computing apparatus comprising:
    a processor; and
    a memory storing instructions that, when executed by the processor, configure the apparatus to:
        acquire, by a computer having one or more processors, a video showing at least part of a worker from a camera system;
        identify, with the computer, a first worker profile based on personal protective equipment of the worker in the video, wherein the identifying the first worker profile comprises:
            identifying personal protective equipment worn by the worker in the video;
            associating identified personal protective equipment with a first transient worker profile;
            comparing the identified personal protective equipment in the first transient worker profile with a plurality of personal protective equipment records from a plurality of stored worker profiles; and
            identifying the first worker profile at least partially based on a correspondence of the identified personal protective equipment in the first transient worker profile with a personal protective equipment record associated with a first worker profile from the plurality of stored worker profiles;

add the first transient worker profile to the plurality of stored worker profiles based on a weak correspondence of the identified personal protective equipment with any of the plurality of personal protective equipment records;

identify, with the computer, a second worker profile based on a worker movement characteristic of the worker in the video;

determine, with the computer, an identity of the worker within the video based on the correspondence between the first worker profile and the second worker profile; and perform at least one action in response to determining the identity of the worker.

10. The computing apparatus of claim 9, wherein the personal protective equipment record is based on pre-determined personal protective equipment for the worker.

11. The computing apparatus of claim 9, wherein the instructions further configure the apparatus to:

determine whether the identified personal protective equipment matches a pre-determined personal protective equipment for the first worker profile;

perform at least one action in response to the pre-determined personal protective equipment matching all identified personal protective equipment for the first worker profile.

12. The computing apparatus of claim 9, wherein the identifying the second worker profile comprises:

determining a worker movement characteristic of the worker in the video;

associating the worker movement characteristic with a second transient worker profile;

determining a worker movement characteristic metric for the worker movement characteristic of the worker;

comparing the worker movement characteristic metric in the second transient worker profile with a plurality of worker movement characteristic metric records from the plurality of stored worker profiles.

13. The computing apparatus of claim 12, wherein the instructions further configure the apparatus to:

identify the second worker profile at least partially based on a correspondence of the worker movement characteristic metric from the second transient worker profile with a worker movement characteristic metric record for a second worker profile from the plurality of stored worker profiles.

14. The computing apparatus of claim 12, wherein the worker movement characteristic is a gait of the worker.

* * * * *